(12) United States Patent
Koide et al.

(10) Patent No.: US 6,554,606 B1
(45) Date of Patent: Apr. 29, 2003

(54) MOLD CLAMPING APPARATUS OF INJECTION MOLDING MACHINE

(75) Inventors: Atsushi Koide, Nagano (JP); Hiroo Okubo, Nagano (JP); Junichi Yamashita, Nagano (JP); Isamu Yamaguchi, Nagano (JP)

(73) Assignee: Nissei Plastic Industrial Co., Ltd., Nagano-Ken (JP)

( * ) Notice: Subject to any disclaimer, the term of this patent is extended or adjusted under 35 U.S.C. 154(b) by 316 days.

(21) Appl. No.: 09/667,762

(22) Filed: Sep. 22, 2000

(30) Foreign Application Priority Data

Sep. 22, 1999 (JP) ............................................. 11-269328

(51) Int. Cl.[7] .............................................. B29C 45/64
(52) U.S. Cl. ...................... 425/590; 425/451.7; 425/595
(58) Field of Search ................................. 425/590, 595, 425/451.2, 451.7, 451.9

(56) References Cited

U.S. PATENT DOCUMENTS 3,270,372 A * 9/1966 Hesse ...................... 425/451.2
3,716,323 A * 2/1973 Classen ................... 425/451.2
5,018,961 A * 5/1991 Miese et al. ............. 425/450.1

FOREIGN PATENT DOCUMENTS

JP          8-1847          1/1996

* cited by examiner

Primary Examiner—James P. Mackey
(74) Attorney, Agent, or Firm—Birch, Stewart, Kolasch & Birch, LLP

(57) ABSTRACT

A mold clamping apparatus of an injection molding machine includes a drive mechanism. The drive mechanism includes a first drive mechanism for opening/closing a mold at high speed through advancement/retreat of a movable platen effected by means of a first drive motor unit and a first ball screw mechanism; a second drive mechanism for clamping the mold at high pressure through application of pressure to a pressing member effected by means of a second drive motor unit and a second ball screw mechanism; an engagement mechanism for engaging the movable platen with the pressing member in the course of advancement of the movable platen; and a clutch mechanism which is operated after establishment of the engagement effected by the engagement mechanism, in order to interlock the pressing member with the movable platen to thereby enable the pressing member to apply pressure to the movable platen.

7 Claims, 4 Drawing Sheets

MOLD CLAMPING APPARATUS OF INJECTION MOLDING MACHINE

BACKGROUND OF THE INVENTION

1. Field of the Invention

The present invention relates to a mold clamping apparatus of an injection molding machine, equipped with a drive mechanism for opening/closing and clamping a mold by use of a drive motor and a ball screw mechanism.

2. Description of the Related Art

A conventional mold clamping apparatus of an injection molding machine, equipped with a drive mechanism for opening/closing and clamping a mold by use of a drive motor and a ball screw mechanism, is disclosed in, for example, Japanese Utility Model Publication (kokoku) No. 8(1996)-1847.

The disclosed mold clamping apparatus includes a first ball nut disposed rotatably on a movable platen; a mold-clamping motor for rotating the first ball nut; a second ball screw rotatably screw-engaged with the movable platen and supported on a base; a mold-opening/closing motor for rotating the second ball screw; a first ball screw screw-engaged with the first ball nut and having a spline portion; a mold-clamping housing disposed on the base and having a hole portion formed therein in order to receive the spline portion; a support plate disposed in the vicinity of the hole portion and adapted to hold the spline portion; and a stopper plate disposed movably and adapted to stop up the hole portion.

However, the above-mentioned conventional mold clamping apparatus involves the following problems.

First, since a drive system for opening/closing the mold at high speed and a drive system for clamping the mold at high pressure are independent of each other and do not assume symmetry (equilibrium), the drive systems involve difficulty in operating smoothly and place limitations on an increase in speed of opening/closing the mold and an increase in mold clamp pressure.

Second, mechanism components are independent of each other and are dispersed; in other words, configuration or layout is not designed rationally, resulting in an increase in the overall size of the mold clamping apparatus.

SUMMARY OF THE INVENTION

An object of the present invention is to provide a mold clamping apparatus of an injection molding machine capable of operating smoothly and enabling an increase in speed of opening/closing a mold and an increase in mold clamp pressure.

Another object of the present invention is to provide a mold clamping apparatus of an injection molding machine, capable of attaining a compact overall size thereof through rational design of configuration and layout.

To achieve the above objects, the present invention provides a mold clamping apparatus of an injection molding machine, comprising a drive mechanism which, in turn, comprises a first drive mechanism for opening/closing the mold at high speed through advancement/retreat of a movable platen effected by means of a first drive motor unit and a first ball screw mechanism; a second drive mechanism for clamping the mold at high pressure through application of pressure to a pressing member effected by means of a second drive motor unit and a second ball screw mechanism; an engagement mechanism for engaging the movable platen with the pressing member in the course of advancement of the movable platen; and a clutch mechanism which is operated after establishment of the engagement effected by the engagement mechanism, in order to interlock the pressing member with the movable platen to thereby enable the pressing member to apply pressure to the movable platen.

The first drive mechanism causes the movable platen to advance/retreat, to thereby open/close the mold at high speed. In the course of advancement of the movable platen (in the course of closing the mold), the movable platen engages the pressing member via the engagement mechanism. As a result, the pressing member and the movable platen advance together. At this time, the clutch mechanism interlocks the pressing member and the movable platen so that pressure can be applied to the movable platen by means of the pressing member. Thus, as soon as the movable platen reaches a predetermined position where closing of the mold ends, the second drive mechanism can start high-pressure mold-clamping. High-pressure mold-clamping is carried out in the following manner. The second drive mechanism applies pressure to the pressing member, which, in turn, applies pressure to the movable platen via the clutch mechanism.

DETAILED DESCRIPTION OF THE PREFERRED EMBODIMENT

An embodiment of the present invention will next be described in detail with reference to the drawings. The accompanying drawings are illustrative of the embodiment and are not meant to limit the scope of the invention. In order to describe the invention clearly, detailed description of known parts is omitted.

First, the configuration of a mold clamping apparatus 1 according to the present embodiment will be described with reference to FIGS. 1 to 4.

Figure 1:
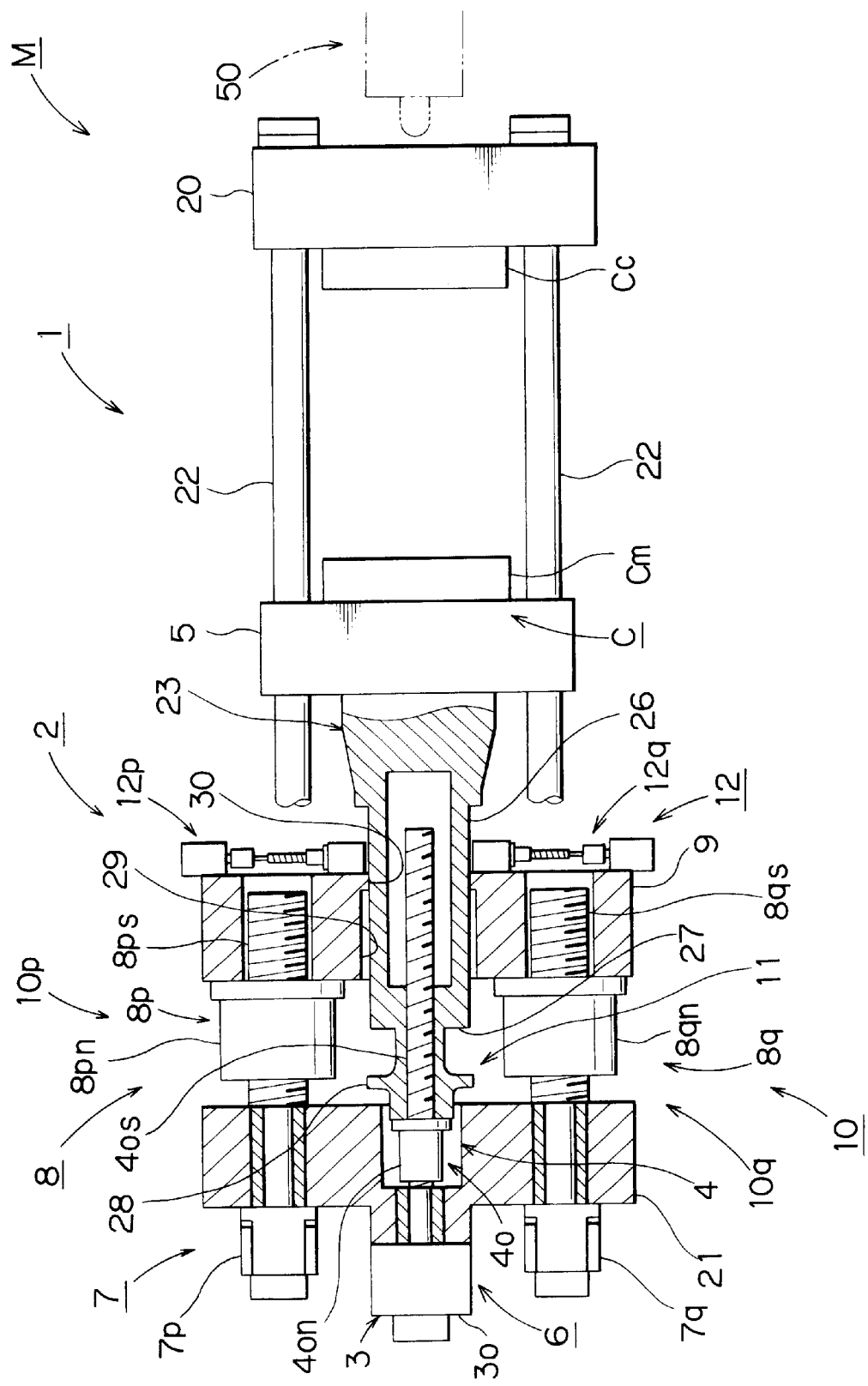
FIG. 1 is a partially sectional plan view of a mold clamping apparatus according to an embodiment of the present invention.
Figure 2:
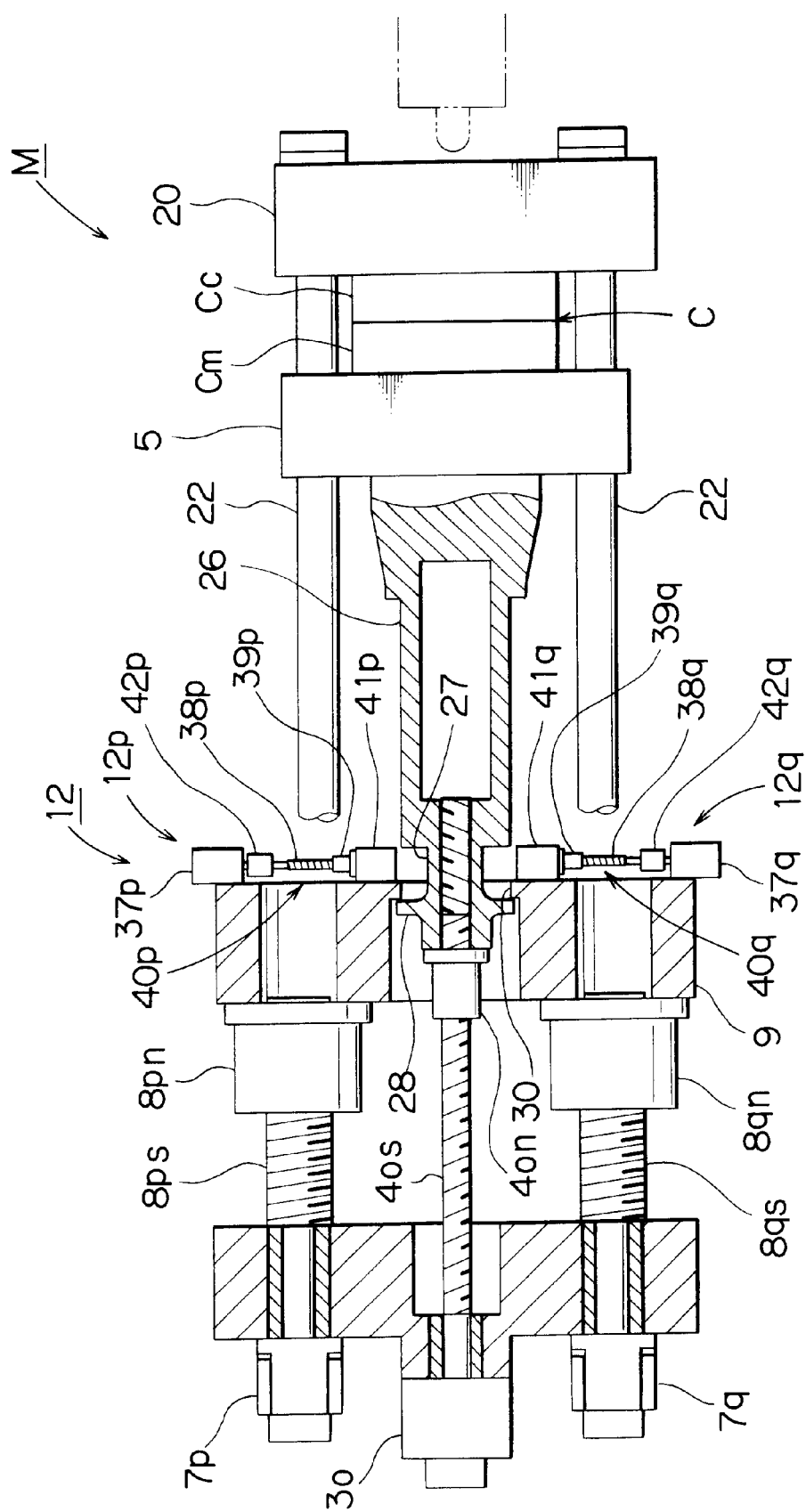
FIG. 2 is a partially sectional plan view of the mold clamping apparatus of FIG. 1, showing a state in which a movable platen is advanced.

In FIGS. 1 and 2, symbol M denotes an injection molding machine, which includes the mold clamping apparatus 1 and an injection apparatus 50. The mold clamping apparatus 1 includes a stationary platen 20 and a drive base 21 which are separated from each other. The stationary platen 20 and the drive base 21 are fixedly mounted on an unillustrated machine base. Four tie bars 22 (see FIG. 4) extend between the stationary platen 20 and the drive base 21. A movable platen 5 is mounted slidably on the tie bars 22. A movable mold Cm is attached to the movable platen 5, while a stationary mold Cc is attached to the stationary platen 20. The movable mold Cm and the stationary mold Cc constitute a mold C.

A drive mechanism 2 is disposed by use of the drive base 21. A nut attachment member 23 is attached to the surface of the movable platen 5 which faces the drive base 21, at the center thereof. A first drive mechanism 6 is disposed between the nut attachment member 23 and the drive base 21. The first drive mechanism 6 includes a single servomotor (drive motor) 3o—which constitutes a first drive motor unit 3 and is attached to the center of the drive base 21—and a single ball screw mechanism 4o—which constitutes a first ball screw mechanism 4. One end of a ball screw 4os of the ball screw mechanism 4o is coupled with (connected directly to) a rotor shaft of the servomotor 3o. A nut 4on of the ball screw mechanism 4o is fixedly attached to a rear end of the nut attachment member 23. The portion of the one end of the ball screw 4os is rotatably supported by a bushing (bearing) mounted in the drive base 21. Since the first drive mechanism 6 is intended to open/close the mold at high speed through advancement/retreat of the movable platen 5, the servomotor 3o and the ball screw mechanism 4o can be of a relatively small size. The nut attachment member 23 assumes a longitudinally elongated form and includes a cylindrical portion 26 extending through a pressing member 9, which will be described later; an engagement groove portion 27 formed at a rear section of the cylindrical portion 26; and an engagement protrusion 28 formed on the rear side of the engagement groove portion 27.

A left-hand drive mechanism 10p and a right-hand drive mechanism 10q are disposed symmetrically with respect to the first drive mechanism 6. The left-hand drive mechanism 10p and the right-hand drive mechanism 10q constitute a second drive mechanism 10. The pressing member 9 is mounted slidably on the tie bars 22 between the movable platen 5 and the drive base 21. An opening portion 29 for allowing the cylindrical portion 26 to extend therethrough is formed at the center of the pressing member 9. A counter engagement protrusion 30 is formed at the front end of the opening portion 29 in such a manner as to project radially inward (toward the center). The counter engagement protrusion 30 and the aforementioned engagement protrusion 28 constitute an engagement mechanism 11 for engaging the movable platen 5 and the pressing member 9 in the course of advancement of the movable platen 5.

Figure 4:
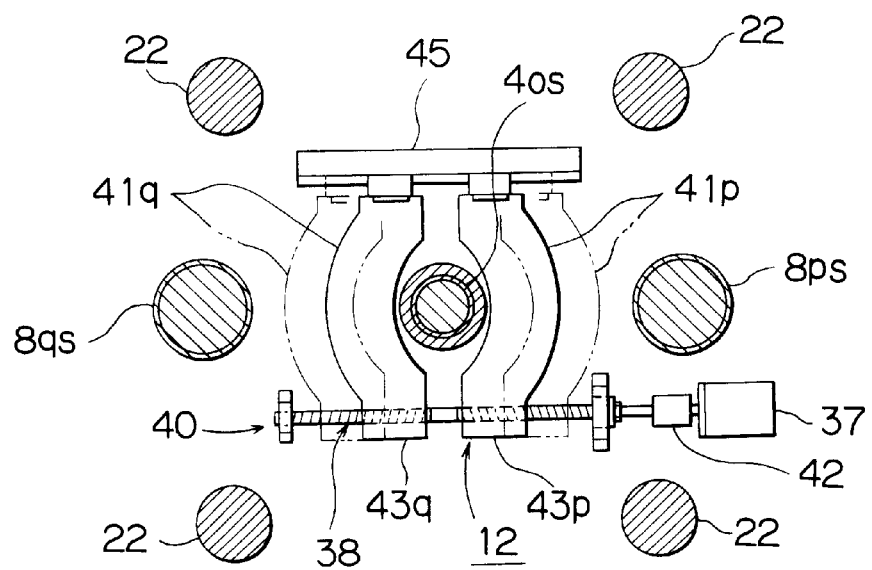
FIG. 4 is partially sectional front view of the mold clamping apparatus of FIG. 1, showing the positional relationship among tie bars and ball screws, and a modified example of the clutch mechanism.

The left-hand drive mechanism 10p includes a servomotor (drive motor) 7p attached to the left side of the drive base 21, and a ball screw mechanism 8p. One end of a ball screw 8ps of the ball screw mechanism 8p is coupled with (connected directly to) a rotor shaft of the servomotor 7p. A nut 8pn of the ball screw mechanism 8p is fixedly attached to the left side of the pressing member 9. The right-hand drive mechanism 10q includes a servomotor (drive motor) 7q attached to the right side of the drive base 21, and a ball screw mechanism 8q. One end of a ball screw 8qs of the ball screw mechanism 8q is coupled with (connected directly to) a rotor shaft of the servomotor 7q. A nut 8qn of the ball screw mechanism 8q is fixedly attached to the right side of the pressing member 9. The servomotors 7p and 7q constitute a second drive motor unit 7. The ball screw mechanisms 8p and 8q constitute a second ball screw mechanism 8. The one end of the ball screw 8ps is rotatably supported by a bushing (bearing) mounted in the drive base 21. Similarly, the one end of the ball screw 8qs is rotatably supported by a bushing (bearing) mounted in the drive base 21. Since the left-hand drive mechanism 10p and the right-hand drive mechanism 10q are intended to clamp a mold at high pressure through application of pressure to the pressing member 9, the servomotors 7p and 7q are of low speed and large driving torque. Also, the ball screws 8ps and 8qs of the ball screw mechanisms 8p and 8q, respectively, are of relatively large diameter and small pitch (small lead). FIG. 4 shows the positional relationship among the four tie bars 22, the central ball screw 4os, and the symmetrically disposed ball screws 8ps and 8qs.

A clutch mechanism 12 is disposed on the surface of the pressing member 9 which faces the movable platen 5. As shown in FIG. 2, the clutch mechanism 12 includes symmetrically disposed left-hand clutch mechanism 12p and right-hand clutch mechanism 12q. The left-hand clutch mechanism 12p includes a drive motor 37p; a ball screw mechanism 40p including a ball screw 38p to be rotated by the drive motor 37p; and a clutch plate 41p fixedly attached to a nut 39p of the ball screw mechanism 40p. The drive motor 37p and the ball screw 38p are connected by means of an elastic coupling 42p so as to prevent occurrence of galling in the course of movement of the clutch plate 41p. Similarly, the right-hand clutch mechanism 12q includes a drive motor 37q; a ball screw mechanism 40q including a ball screw 38q to be rotated by the drive motor 37q; and a clutch plate 41q fixedly attached to a nut 39q of the ball screw mechanism 40q. The drive motor 37q and the ball screw 38q are connected by means of an elastic coupling 42q so as to prevent occurrence of galling in the course of movement of the clutch plate 41q. Thus, through operation of the drive motors 37p and 37q, the clutch plates 41p and 41q can be caused to move toward and away from each other.

FIG. 4 shows a different type of clutch mechanism 12. The clutch mechanism 12 shown in FIG. 4 includes a drive motor 37; a ball screw mechanism 40 having a ball screw 38, which is rotated by the drive motor 37; two clutch plates 41p and 41q, into which two corresponding nuts 43p and 43q of the ball screw mechanism 40 are incorporated at their ends; and an elastic coupling 42 adapted to connect the drive motor 37 and the ball screw 38. The left half and right half of the ball screw 38 are threaded in a mutually reverse manner. When the drive motor 37 is operated, the clutch plates 41p and 41q can be moved symmetrically as in the case of those shown in FIG. 1. The other ends of the clutch plates 41p and 41q are supported slidably by the guide rail 45. Basically, the clutch plates 41p and 41q shown in FIG. 1 assume a shape similar to that of the clutch plates 41p and 41q shown in FIG. 4.

Figure 3:
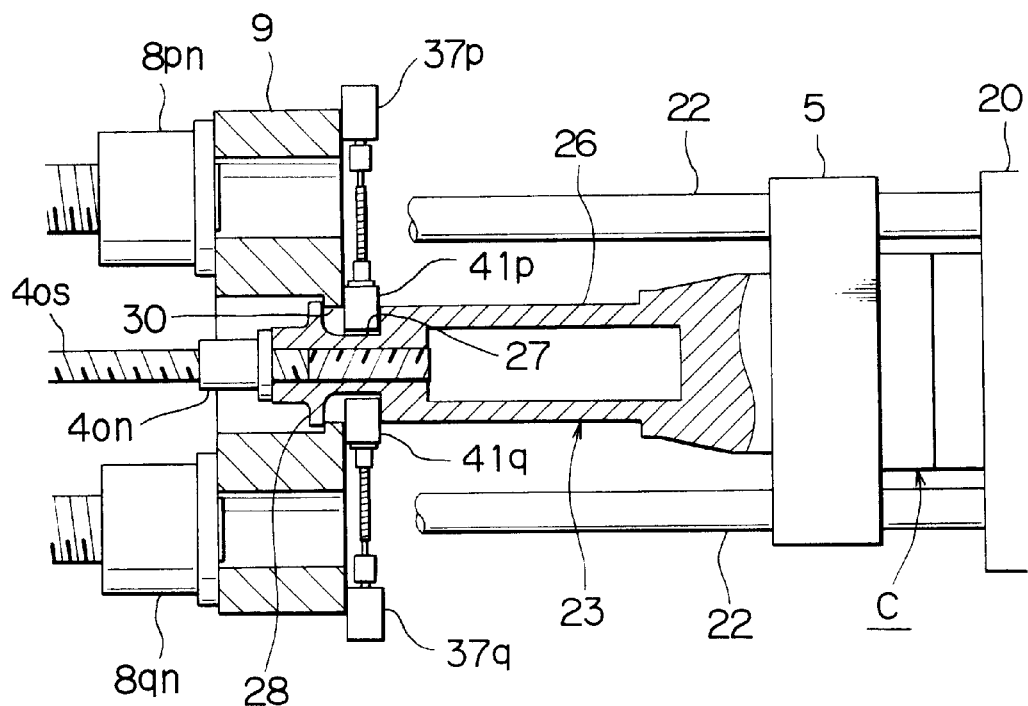
FIG. 3 is a partially sectional plan view of the mold clamping apparatus of FIG. 1, showing a state in which a clutch mechanism is operated.
Figure 5:
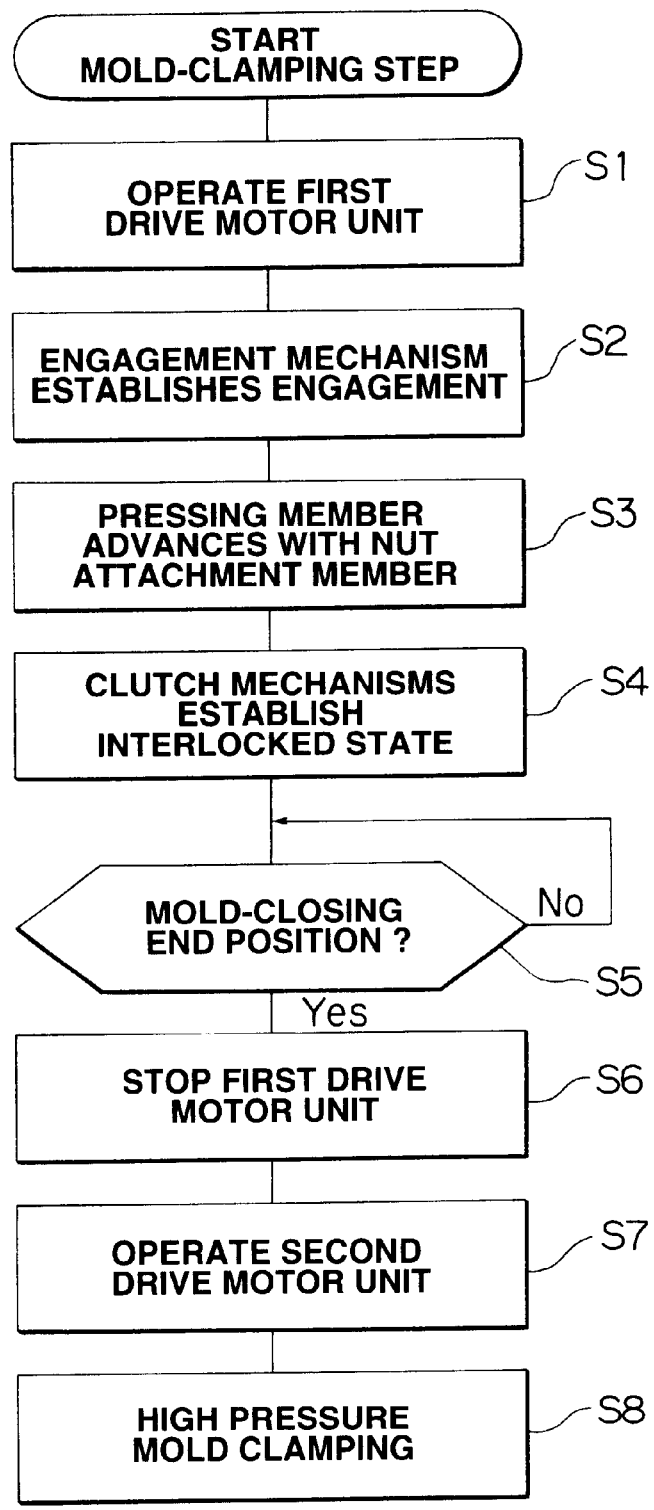
FIG. 5 is a flowchart showing the operation of the mold clamping apparatus of FIG. 1 in a step of clamping a mold.

Next, the operation, particularly a mold clamping operation, of the mold clamping apparatus 1 according to the present embodiment will be described with reference to FIGS. 1 to 3 and in accordance with a flowchart shown in FIG. 5.

The mold clamping apparatus 1 is now in a state in which a mold is opened. The movable platen 5 is situated at the farthest retreat position. The pressing member 9 stands by while being retreated by a predetermined stroke from a mold-closing end position. The clutch plates 41p and 41q of the clutch mechanism 12 are situated at respective uninterlocking positions at which the clutch plates 41p and 41q are separated from each other. Notably, the predetermined stroke is determined on the basis of the time required for the clutch plates 41p and 41q to move to respective interlocking positions at which the clutch plates 41p and 41q come close to each other. This will be described later.

In a mold-clamping process, first, the servomotor 3o (first drive motor unit 3) operates to thereby rotate the ball screw 4os of the ball screw mechanism 40 (step S1). As a result, the movable platen 5 advances at high speed in order to close a mold. In the course of advancement of the movable platen 5, the engagement protrusion 28 and the counter engagement protrusion 30 engage with each other; i.e., the engagement mechanism 11 enters an engaged state (step S2). As a result, the pressing member 9 advances together with the movable platen 5 (step S3). FIG. 2 shows a state in which the engagement protrusion 28 is engaged with the counter engagement protrusion 30. In this state, the engagement groove portion 27 faces the clutch plates 41p and 41q. Thus, at this point of time, the clutch plates 41p and 41q are moved toward each other so as to be fitted into the engagement groove portion 27. That is, control is performed in the following manner. When the movable platen 5 reaches a predetermined position where the engagement protrusion 28 engages the counter engagement protrusion 30, the drive motors 37p and 37q of the clutch mechanism 12 are operated so as to move the clutch plates 41p and 41q toward each other, whereby the clutch plates 41p and 41q are fitted into the engagement groove portion 27 to thereby interlock the pressing member 9 with the movable platen 5 (step S4). The aforementioned predetermined stroke is determined such that the interlocking operation of the clutch mechanism 12 is completed before the movable platen 5 reaches the mold-closing end position. Thus, as soon as the movable platen 5 reaches the mold-closing end position, high-pressure mold-clamping can be started.

When the movable platen 5 reaches the mold-closing end position, the servomotor 3o (first drive motor unit 3) is stopped, and the servomotors 7p and 7q (second drive motor unit 7) are operated (steps S5, S6, and S7). The ball screws 8ps and 8qs of the ball screw mechanisms 8p and 8q, respectively, are rotated to thereby apply pressure to the pressing member 9. The pressure applied to the pressing member 9 is transmitted to the cylindrical portion 26 through the clutch plates 41p and 41q, whereby the movable platen 5 is pressed; i.e., a mold is clamped at high pressure (step S8).

Notably, a type in which a nut of a ball screw mechanism is fixed directly to the movable platen 5 raises a problem such that stress (load) which a ball screw generates in the direction of rotation is directly applied to the movable platen 5 through the nut. Therefore, when two ball screw mechanisms 8p and 8q are disposed as in the case of the present embodiment, the ball screws 8ps and 8qs are threaded usually in a mutually reverse manner so as to cancel the respective stresses (loads) generated in the respective directions of rotation. The present embodiment employs the clutch plates 41p and 41q, which come into contact with the cylindrical portion 26, so that stresses (loads) which the ball screws 8ps and 8qs generate in the respective directions of rotation are not transmitted to the movable platen 5 through the nuts 8pn and 8qn. Accordingly, both the ball screws 8ps and 8qs can be threaded regularly.

As described above, in the mold clamping apparatus 1 according to the present embodiment, the drive system for opening/closing a mold at high speed and the drive system for clamping the mold at high pressure are interlocked with each other for carrying out linked operation and assume symmetry (equilibrium), thereby providing smooth operation and enabling an increase in speed of opening/closing the mold and an increase in mold clamp pressure. Also, the rationally designed configuration and layout imparts compactness to the mold clamping apparatus 1. Through employment of the engagement mechanism 11; i.e., the engagement protrusion 28 and the counter engagement protrusion 30, the second drive mechanism 10, which generates a large driving force, can be used for opening the mold. Thus, a mold-opening operation, which requires a relatively large force, can be performed smoothly and reliably.

While the present invention has been described with reference to the preferred embodiment, the present invention is not limited thereto. Regarding structural details, shape, material, quantity, techniques, among others, modifications and any omission or addition may be possible as needed without departing from the scope of the invention. For example, the above embodiment is described while mentioning the first drive mechanism 6 composed of the single drive motor 3o and the single ball screw mechanism 4o, which are disposed at the center of the movable platen 5, as well as the second drive mechanism 10 composed of the two drive motors 7p and 7q and the two ball screw mechanisms 8p and 8q, which are disposed on opposite sides of the first drive mechanism 6. However, the following configurations may be acceptable. The second drive mechanism 10 is composed of a single drive motor and a single ball screw mechanism, which are disposed at the center of the movable platen 5. The first drive mechanism 6 is composed of two drive motors and two ball screw mechanisms, which are disposed on opposite sides of the second drive mechanism 10. Alternatively, each of the second drive mechanism 10 and the first drive mechanism 6 is composed of two or more drive motors and ball screw mechanisms. The above embodiment is described while mentioning direct coupling between the ball screw mechanism and the rotor shaft of each drive motor. However, the ball screw mechanism and the rotor shaft may be connected, as needed, through a rotation transmission mechanism such as a planetary reduction gear mechanism. Examples of the ball screw mechanism include a so-called roller screw mechanism. The above embodiment is described while mentioning the case in which, through employment of a predetermined stroke, an interlocking operation of the clutch mechanism 12 is completed before the movable platen 5 reaches the mold-closing end position. However, the present invention does not exclude the case in which the clutch mechanism 12 starts the interlocking operation after the movable platen 5 reaches the mold-closing end position.

What is claimed is:

1. A mold clamping apparatus of an injection molding machine, comprising:

a first drive mechanism for opening/closing a mold at high speed through advancement/retreat of a movable platen effected by means of a first drive motor unit and a first ball screw mechanism;

a second drive mechanism for clamping the mold at high pressure through application of pressure to a pressing member effected by means of a second drive motor unit and a second ball screw mechanism, wherein said second drive mechanism comprises two drive motors and two ball screw mechanisms, which are disposed on opposite sides of said first drive mechanism;

an engagement mechanism for engaging the movable platen with the pressing member in the course of advancement of the movable platen; and a clutch mechanism which is operated after establishment of the engagement effected by the engagement mechanism, in order to interlock the pressing member with the movable platen to thereby enable the pressing member to apply pressure to the movable platen.

2. A mold clamping apparatus of an injection molding machine according to claim 1, wherein said first drive mechanism comprises a single drive motor and a single ball screw mechanism, which are disposed at the center of the movable platen.

3. A mold clamping apparatus of an injection molding machine according to claim 2, wherein said single ball screw mechanism comprises a ball screw, one end of which is directly connected to a rotor shaft of said single drive motor, and a nut fixedly attached to an end of a nut attachment member disposed on the movable platen.

4. A mold clamping apparatus of an injection molding machine according to claim 1, wherein each of said two ball screw mechanisms comprises a ball screw, one end of which is directly connected to a rotor shaft of the corresponding drive motor, and a nut fixedly attached to the pressing member.

5. A mold clamping apparatus of an injection molding machine according to claim 1, wherein said engagement mechanism comprises an engagement protrusion formed on a nut attachment member and a counter engagement protrusion formed on the pressing member and wherein the engagement protrusion engages the counter engagement protrusion in the course of advancement of the movable plant.

6. A mold clamping apparatus of an injection molding machine according to claim 1, wherein said clutch mechanism comprises two clutch mechanisms disposed on opposite sides of said first drive mechanism.

7. A mold clamping apparatus of an injection molding machine according to claim 6, wherein each of the two clutch mechanisms comprises a drive motor disposed on the pressing member, a ball screw mechanism having a ball screw to be rotated by the drive motor, and a clutch plate fixedly attached to a nut of the ball screw mechanism, and wherein the drive motor causes the clutch plate to move between an interlocking position, at which the clutch plate is fitted into an engagement groove formed in a nut attachment member disposed on the movable platen, and an uninterlocking position, at which the clutch plate is situated away from the engagement groove.

* * * * *